(12) United States Patent
Tungatkar

(10) Patent No.: US 9,600,441 B2
(45) Date of Patent: Mar. 21, 2017

(54) APPARATUS AND METHOD FOR CONTROLLING NETWORK ACCESS FOR APPLICATIONS ON MOBILE TERMINALS

(71) Applicant: Samsung Electronics Co. Ltd., Suwon-si, Gyeonggi-do (KR)

(72) Inventor: Gaurav Sharad Tungatkar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 13/793,540

(22) Filed: Mar. 11, 2013

(65) Prior Publication Data

US 2014/0258480 A1 Sep. 11, 2014

(51) Int. Cl.
*G06F 15/173* (2006.01)
*G06F 15/177* (2006.01)
*H04W 12/08* (2009.01)
*H04L 29/06* (2006.01)
*H04W 88/06* (2009.01)

(52) U.S. Cl.
CPC .......... *G06F 15/177* (2013.01); *H04W 12/08* (2013.01); *H04L 63/0236* (2013.01); *H04W 88/06* (2013.01)

(58) Field of Classification Search
None
See application file for complete search history.

(56) References Cited

U.S. PATENT DOCUMENTS

| 5,987,611 A | * | 11/1999 | Freund | G06F 21/552 726/4 |
|---|---|---|---|---|
| 2005/0238046 A1 | | 10/2005 | Hassan et al. | |
| 2008/0080457 A1 | | 4/2008 | Cole | |
| 2009/0006847 A1 | * | 1/2009 | Abzarian et al. | 713/164 |

FOREIGN PATENT DOCUMENTS

| EP | 1 313 290 A1 | 5/2003 |
| EP | 1 465 382 A2 | 10/2004 |
| KR | 10-2011-0016303 A | 2/2011 |

OTHER PUBLICATIONS

Sadiq, Saad. "Firewall for Android Phone." Posted online at <http://www.addictivetips.com/mobile/firewall-for-android-phone/>. Sep. 28, 2010.*

* cited by examiner

*Primary Examiner* — Scott B Christensen
(74) *Attorney, Agent, or Firm* — Jefferson IP Law, LLP

(57) ABSTRACT

An apparatus and method for configuring a firewall application for controlling network access of applications included on a mobile terminal are provided. The method includes executing the firewall application displaying a list of at least one application stored on the mobile terminal, selecting at least one of the applications from the displayed list, selecting at least one parameter type corresponding to the at least one selected application, and configuring at least one parameter setting corresponding to the at least one selected parameter type, wherein the firewall application is executed according to the configured at least one parameter setting.

30 Claims, 5 Drawing Sheets

| APPLICATION LIST | PARAMETER TYPE | PARAMETER SETTING |
|---|---|---|
| FACEBOOK | NETWORK SECURITY | WEP2 |
| NETFLIX | SSID | LINKSYS |
| INSTAGRAM | LOCATION | (33.2, -18.3) |
| PANDORA | NETWORK TYPE | Wi-Fi |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

FIG. 2

APPARATUS AND METHOD FOR CONTROLLING NETWORK ACCESS FOR APPLICATIONS ON MOBILE TERMINALS

BACKGROUND OF THE INVENTION

1. Field of the Invention

The present invention relates to an apparatus and method for controlling network access for applications on mobile devices. More particularly, the present invention relates to an apparatus and method for controlling network access of applications on mobile devices according at least one of predetermined conditions and a user input.

2. Description of the Related Art

Mobile terminals, such as laptops, mobile phones, smart phones, Personal Digital Assistants (PDAs), tablet computers, electronic-books (e-books), wireless music players, Personal Media Players (PMPs), portable gaming devices, and other similar and/or suitable portable electronic devices may provide communication services between the mobile devices and a wireless communication network. As technology has advanced, mobile terminals now provide many additional features beyond simple voice communication, and may include a wide variety of applications that provide many different types of data communications and network services. For example, mobile terminals may include applications that provide a user a variety of services and/or features, such as access to social networks and/or Social Network Services (SNSs), electronic-mail (e-mail), messaging services, streaming media content including audio and video content, video communication services including teleconferencing and direct communication, remote data storage and access, network cloud services, and a variety of other data services involving push and/or pull services for any applications that may be included on a mobile devices.

With the plurality of applications that provide a wide variety of services and features on mobile terminals, a mobile terminal may include a wide variety of user information that may be stored thereupon or communicated via the wireless communication, wherein the user information may include private, personal, and confidential data and/or information, or any other information that a user may want to be protected from access via the wireless communication network. Furthermore, the plurality of applications that may be included in a mobile device may access the wireless communication network and/or transmit and receive information automatically without a user's knowledge and/or explicit execution of the application, at predetermined times and/or locations, or in any other similar and/or suitable manner. However, a firewall may be used to configure a variety of parameters, conditions, rules, restrictions, and/or elements in order to control network access of applications included on mobile terminals.

More specifically, the firewall may be installed on a variety of network elements, such as a terminal, a router, and any other similar network element. The Firewall may analyze and control incoming and/or outgoing network traffic so as to determine whether the incoming and/or outgoing network traffic is permitted ingress and/or egress to the network element which the firewall is installed on. For example, a Windows firewall on a Personal Computer (PC) may automatically configure the firewall settings according to a type of network, such as a home, public, and/or work network and according to a domain. A user may classify a network into one of these predefined types and set the firewall accordingly. However, the Windows firewall does not allow for configuration of parameters with respect to individual applications and the Windows firewall does not consider network location.

Furthermore, although certain types of firewalls may allow for configuration of parameters with respect to individual applications, such firewalls may not provide ingress and egress control, or access control, with respect to a type of network encryption and/or location of a network or the apparatus on which the firewall is disposed. Additionally, firewalls that are implemented on mobile terminals, such as a cell phone or any other similar portable electronic device, may provide may provide access control according to whether the portable electronic device is connected to a WiFi network or a cellular network. However, such firewalls for portable electronic devices may not provide access control with respect to a type of network encryption and/or location of a network. Additionally, although some firewalls for portable electronic devices may provide access control according to location with respect to an Internet Protocol (IP) address, such a system may be highly inaccurate because a public IP address may be assigned by a network operator's gateway, which may be located at a different physical location than a location, such as a cell in a cellular network, of the portable electronic device. Accordingly, location information used by such a firewall may be incorrect.

Accordingly, there is a need for an apparatus and method for controlling network access for applications on mobile devices according to a variety of user determined parameters, conditions, rules, restrictions, and/or elements.

SUMMARY OF THE INVENTION

Aspects of the present invention are to address at least the above-mentioned problems and/or disadvantages and to provide at least the advantages described below. Accordingly, an aspect of the present invention is to provide an apparatus and method for controlling network access on mobile devices.

In accordance with an aspect of the present invention, a method for configuring a firewall application for controlling network access of applications included on a mobile terminal is provided. The method includes executing the firewall application displaying a list of at least one application stored on the mobile terminal, selecting at least one of the applications from the displayed list, selecting at least one parameter type corresponding to the at least one selected application, and configuring at least one parameter setting corresponding to the at least one selected parameter type, wherein the firewall application is executed according to the configured at least one parameter setting.

In accordance with an aspect of the present invention, a method for controlling network access of applications included on a mobile terminal is provided. The method includes selecting at least one application included on the mobile terminal, selecting at least one parameter type corresponding to the at least one selected application, and configuring at least one parameter setting corresponding to the at least one selected parameter type, wherein the network access of the applications is controlled according to the configured at least one parameter setting.

In accordance with another aspect of the present invention, a mobile terminal including a firewall is provided. The mobile terminal includes a display unit for displaying a firewall configuration screen, an input unit for receiving user input to the firewall configuration screen, a firewall unit for executing the firewall application, and a controller for controlling configuration of the firewall application according to a configuration of the firewall, for selecting at least one application included on the mobile terminal, for selecting at least one parameter type corresponding to the at least one selected application; and for configuring at least one parameter setting corresponding to the at least one selected parameter type, wherein the network access of the applications is controlled according to the configured at least one parameter setting.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a firewall configuration screen of a firewall application according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for controlling network access of applications on mobile devices.

Figure 1:
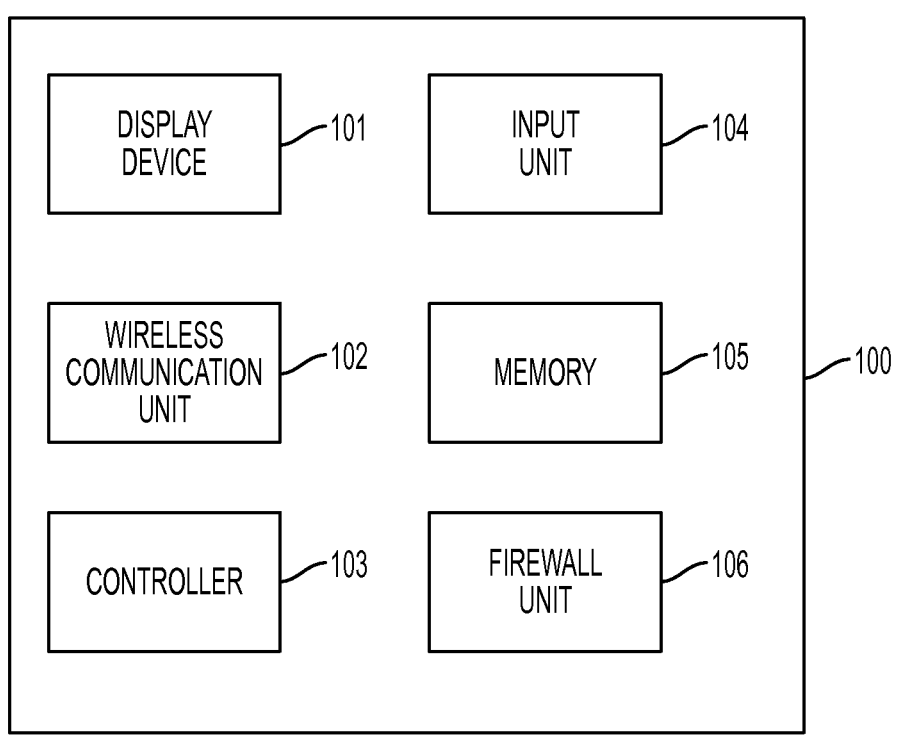
FIG. 1 is a mobile terminal according to an exemplary embodiment of the present invention.

FIG. 1 is a mobile terminal according to an exemplary embodiment of the present invention.

Referring to FIG. 1, a mobile terminal 100 may include a display device 101, a wireless communication unit 102, a controller 103, an input unit 104, a memory 105, and a firewall unit 106. The display device 101 may display information for a user of the mobile terminal 100, such as a variety of screens, multimedia content, graphics, and other information. The input unit 104 may be used to receive a user's input for executing operations of and to input information to the mobile terminal 100. Furthermore, although not shown in the mobile terminal 100, the display device 101 and the input unit 104 may be formed as one unit for displaying information and receiving the user's input, such that the mobile terminal 100 is a touchscreen device including a touchscreen unit and a display device.

The wireless communication unit 102 may be used to transmit and/or receive wireless radio communication signals and may include other radio communication elements that are not shown in FIG. 1, such as an antenna, a modem, a Digital-to-Analog Converter (DAC), and any other similar and/or suitable elements used for radio communications with a wireless network and/or other radio communication devices, such as other portable terminals, transmitting and/or receiving radio communication signals. The memory 105 may be used to store data used and generated by the user of the mobile terminal 100 and may also store applications, a phonebook, multimedia contents, operations and executable commands, and any other data and/or information used in or generated by the operation of the mobile terminal 100.

The controller 103 may control overall operations of the mobile terminal 100, including other elements and operations of the mobile terminal shown in FIG. 1. For example, the controller may control operations of the firewall unit 106, which will be described in further detail below. Furthermore, although not shown the present exemplary embodiment of FIG. 1, the controller 103 and the firewall unit 106 may be formed as one unit. The firewall unit 106 provides firewall services for the mobile terminal 100 and may also provide firewall operations, configuration services and may store information on applications and parameters for the configuration of the firewall. Furthermore, the firewall unit 106 may provide control of egress traffic, i.e. traffic that is being transmitted from the mobile terminal 100, on a per application basis. In other words, the firewall unit 106 may control the data that each application transmits from the mobile terminal 100 such that egress traffic of each of the applications may controlled according to a configuration of the firewall unit 106. Accordingly, the firewall unit 106 may prevent unauthorized users from determining usage patterns, traffic access patterns, and other similar information that may be determined according to analyzing egress traffic of the mobile terminal 100.

FIG. 2 is a firewall configuration screen of a firewall application according to an exemplary embodiment of the present invention.

Referring to FIG. 2, an application list 201 may be provided in a firewall configuration screen 200 of a firewall application that is included in the mobile device 100. The application list 201 may include all applications included on the mobile device or any amount less than all applications. For example, the application list 201 may only include applications that automatically access the wireless communication network, such as applications that access the wireless communication network in the background in order to synchronize information with a network device, and/or applications that include push and/or pull data services. However, the present invention is not limited thereto, and the applications displayed in the application list 201 may include any suitable number and/or type of application that is included in the mobile device.

The firewall configuration screen 200 may also display a parameter type 202 in a selection window allowing for the selection of at least one parameter setting 203 that may be used to determine whether a respective application of the application list 201 may access the wireless communication network. For example, the parameter type 202 may be a location of the mobile terminal, a network type, a type of network security provided by the wireless communication network, a time of day, a network name, a network provider, or any other similar and/or suitable parameter that may be used to control access to the wireless communication network. Furthermore, for each of the parameter type 202, the at least one parameter setting 203 may be selected by the user.

For example, for a social networking application, such as Facebook or any other similar social networking application, if the parameter type 202 is selected to be the network security parameter type, then the user may select the at least one parameter setting 203 for setting a network security level for which the Facebook application may access the wireless communication network. In other words, the user may select the at least one parameter setting 203 to be at least one of Wired Equivalent Privacy (WEP), Wi-Fi Protected Access (WPA)-Pre-Shared Key (PSK), and WPA2, or any other suitable and/or similar network security protocol and/or scheme. In the case where the user selects WPA2 network security, the Facebook application may access the wireless communication network only if a wireless network being accessed by the mobile terminal, such as a Wi-Fi network, uses the WPA2 network security. Accordingly, in such a case, if the mobile terminal 100 is accessing a Wi-Fi network that employs WEP network security, then the Facebook application may be blocked from accessing the Wi-Fi network because the network security used by the Wi-Fi network is not WPA2.

According to another exemplary embodiment, more than one of parameter types may be configured with respect to a single application of the application list 201. For example, in a case where a user desires that the Facebook application only is able to access the wireless communication network when the user has the mobile terminal 100 accessing the user's home Wi-Fi network. In such a case, two of the parameter type 202 that may be selected and set may be a Service Set Identification (SSID) of the user's home Wi-Fi network and a device location. The user may enter the at least one parameter setting 203 corresponding to an SSID for the parameter type 202 and may set the at least one parameter setting 203 to be "LINKSYS."

However, there may be a large number of Wi-Fi networks having their respective SSIDs set as "LINKSYS" and, thus, merely setting the SSID for the parameter type 202 to be the at least one parameter setting 203 of "LINKSYS" may not ensure that the Facebook application access the wireless communication network only when the mobile terminal 100 is accessing the user's home Wi-Fi network. Accordingly, the user may also set a location for the parameter type 202 so that the at least one parameter setting 203 is a geographic location, or any other suitable type of physical or virtual location, corresponding to the user's house.

As such, the user may set the at least one parameter setting 203 to be Global Positioning System (GPS) coordinates and/or information corresponding to the user's house. However, the present invention is not limited thereto, and any suitable location information corresponding to a geographic, physical and/or virtual location may be used as at least one parameter setting 203 of the location for the parameter type 202. Thus, the Facebook application may only access the wireless communication network when the mobile terminal 100 is connected to a user's home Wi-Fi network. Furthermore, a user may set a location as well as a radius surrounding the location in which an application may access the wireless communication network. For example, the user may configure the firewall such that the Facebook application may access the wireless communication network at a specific GPS coordinate, or any other similar and/or suitable location information, and within a 30 meter radius surrounding the specific GPS coordinate.

Figure 3:
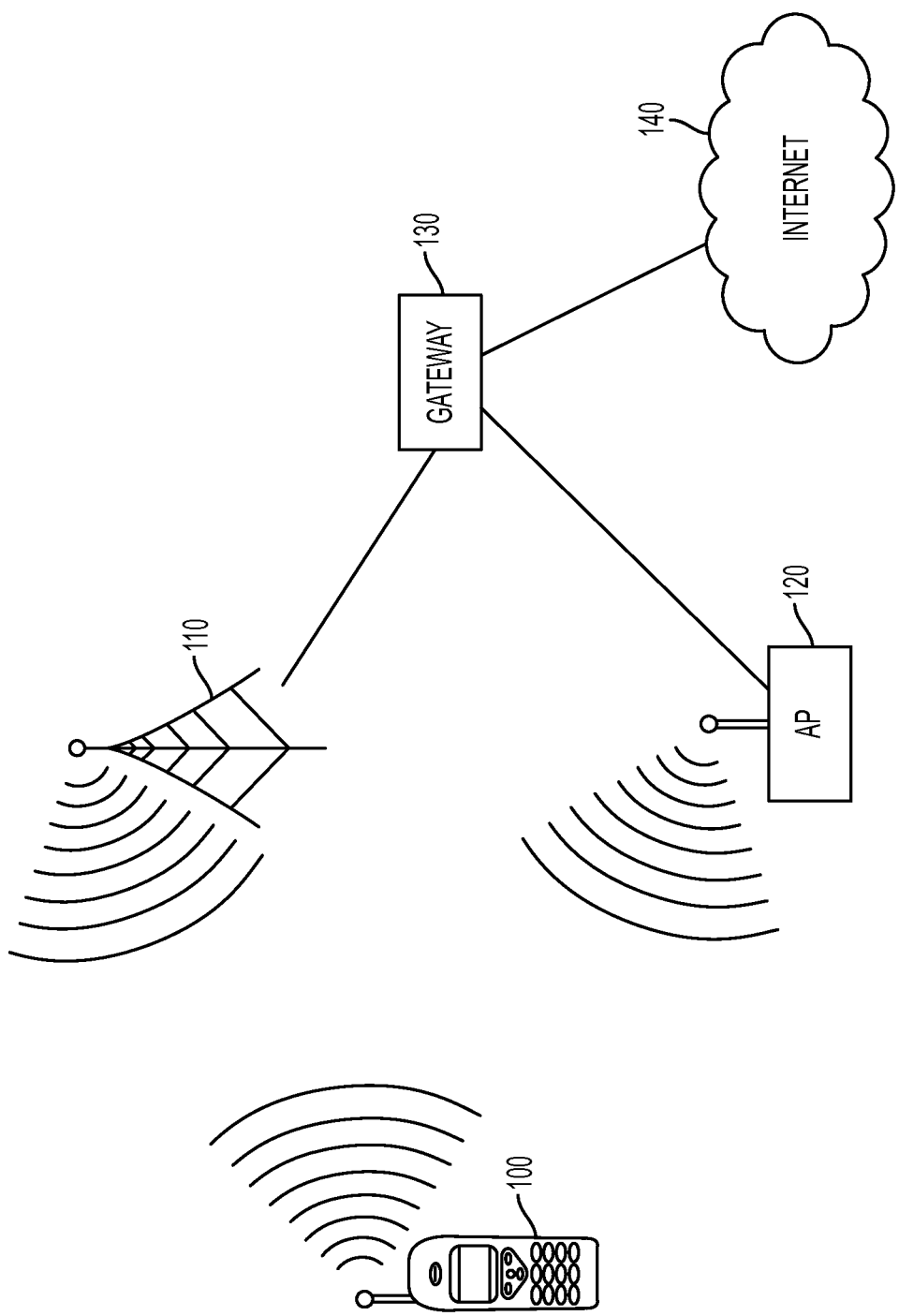
FIG. 3 illustrates wireless communication network including a mobile terminal including a firewall according to exemplary embodiments of the present invention.

FIG. 3 illustrates wireless communication network including a mobile terminal including a firewall according to exemplary embodiments of the present invention.

Referring to FIG. 3, the mobile terminal 100 may communicate with a base station 110 using a cellular network and may also communicate with an Access Point (AP) 120 using a Wi-Fi network. The mobile terminal 100 may include a plurality of applications, any number of which may access the Internet 140 via a gateway 130 using either of the cellular network or the Wi-Fi network. The user of the mobile terminal 100 may configure a firewall in the manner described with respect to FIG. 2. Accordingly, the user may configure the firewall to permit or restrict any one of the plurality of applications included on the mobile terminal 100 to only access the Internet 140 when the AP 120 meets the at least one parameter settings 203 of the firewall. Thus, a user of the mobile terminal 100 may prevent interlopers from easily accessing user data that may be insecurely transmitted from the mobile terminal 100 in a manner unbeknownst to the user.

Figure 4:
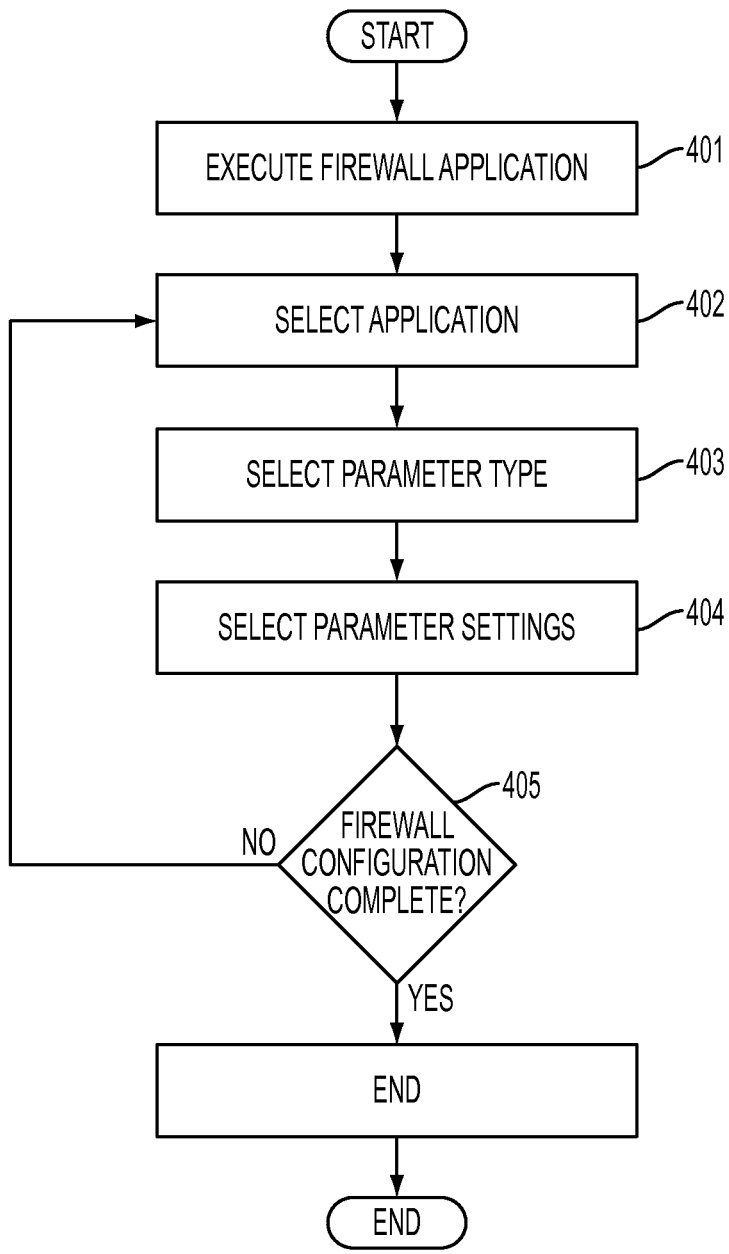
FIG. 4 is a flowchart illustrating a procedure for configuring a firewall included in a mobile terminal according to exemplary embodiments of the present invention.

FIG. 4 is a flowchart illustrating a procedure for configuring a firewall included in a mobile terminal according to exemplary embodiments of the present invention.

Referring to FIG. 4, a user may execute the firewall application included in the mobile terminal 100 in step 401. Accordingly, the mobile terminal 100 may display the firewall configuration screen 200 as shown in FIG. 2. However, the present invention is not limited thereto, and any suitable and/or similar screen and/or method may be used to configure the firewall application included in the mobile terminal 100. Next, in step 402, the user may select any application displayed in the firewall configuration screen 200 so as to configure firewall settings for the selected application. In step 403, the user may select a parameter type, from among a plurality of parameter types, for which parameter settings will be configured by the user.

Then, the user selects the parameter settings corresponding to the parameter type in step 404. However, the present invention is not limited thereto, and the user may enter in the parameter settings via the input unit 104 of the mobile terminal 100. Next, in step 405, it is determined whether the firewall configuration is complete. If the firewall configuration is completed, then the procedure for configuring the firewall is terminated, however, if the firewall configuration is not completed, then the procedure returns to step 402 so that further configuration of the firewall may be performed.

Figure 5:
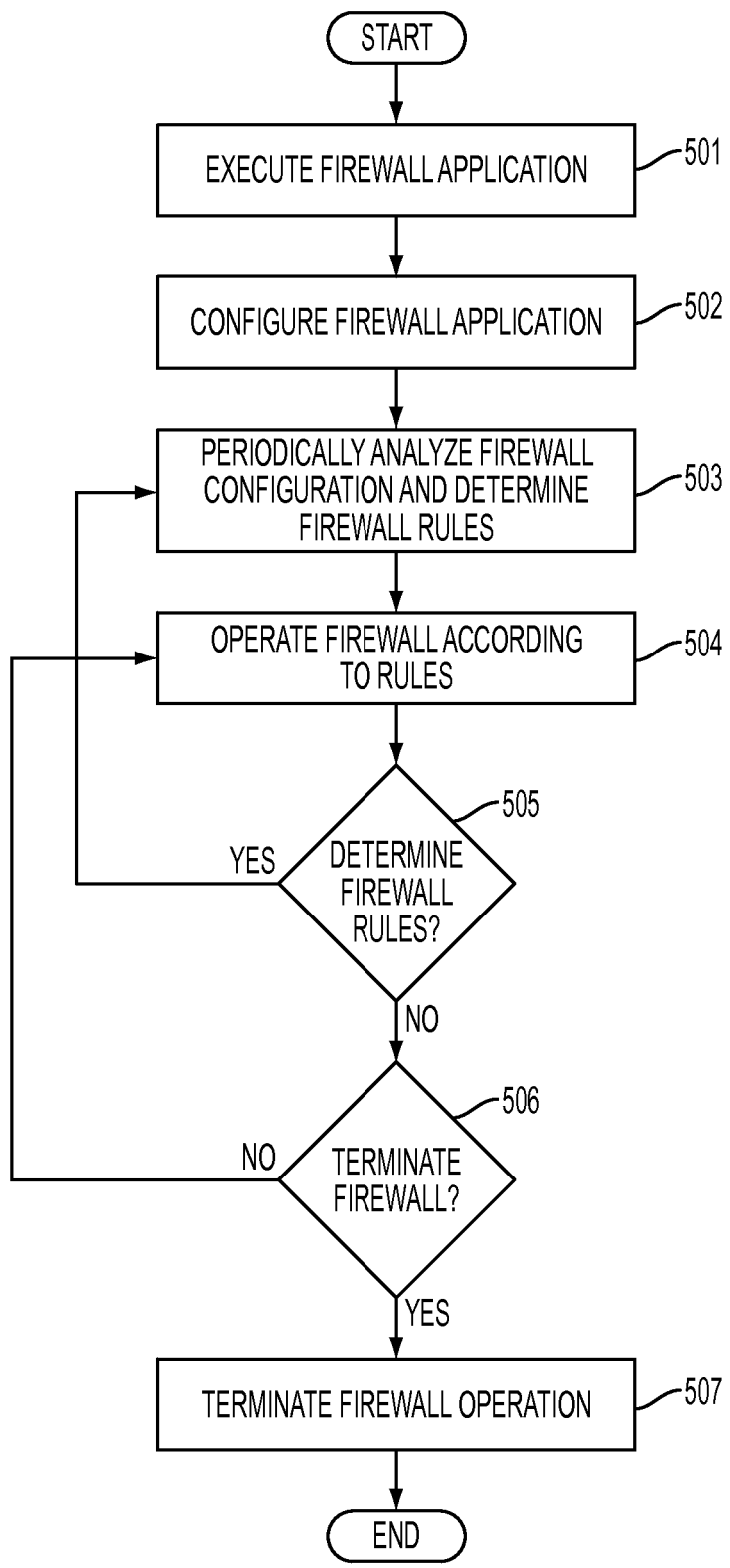
FIG. 5 is a flowchart illustrating a procedure for executing a firewall included in a mobile terminal according to exemplary embodiments of the present invention.

FIG. 5 is a flowchart illustrating a procedure for executing a firewall included in a mobile terminal according to exemplary embodiments of the present invention.

Referring to FIG. 5, a user may execute the firewall application included in the mobile terminal 100 in step 501. Next, in step 502, the user may configure the firewall application according to the exemplary embodiment of FIG. 4. However, the present invention is not limited thereto, and the firewall application may be pre-configured or may be configured according to any similar and/or suitable method. Next, in step 503, the firewall application may periodically analyze the configuration of the firewall application and determine firewall rules. For example, in step 503, the firewall application may determine a current operating state of the firewall application by determining the firewall rules. That is, the firewall application may periodically determine the firewall rules according to the configuration of the firewall application. In other words, the firewall rules may be adjusted at any time according to the periodic determination of the firewall rules, wherein the firewall rules are determined according to the firewall configuration. Furthermore, the firewall rules may be used to determine how the firewall application operates at a given time or from a time when the firewall rules were last determined and until a subsequent time when the firewall rules are again determined. Thus, the firewall application may periodically determine the firewall rules in order to determine a current operating state of the firewall application.

Next, in step 504, the firewall application may operate according the firewall rules. For example, a first firewall rule may restrict operations of a predetermined application, such as a social networking application, so that the predetermined application only transmits outgoing messages under predetermined network conditions. More specifically, a firewall configuration of a mobile terminal may include settings for disallowing the social networking application from generating transmissions when a network type is WiFi and a Service Set Identifier (SSID) is 'linksys', or any other particular SSID, and when the mobile terminal is at least one of at or not at a particular location, such as a GPS coordinate, a location range surrounding a GPS coordinate, or any other similar and/or suitable location information. Accordingly, the firewall application may determine a rule in step 503, according to the above firewall configuration such that, in step 504, the mobile terminal is restricted from sending outgoing transmissions using the social networking application when the mobile terminal is connected to the Wi-Fi network having an SSID of 'linksys' that is outside of a location range surrounding the GPS coordinate. Thus, according to the present exemplary embodiment, when there is a second Wi-Fi network having a common SSID with a first Wi-Fi network that is allowed, the mobile terminal may still be restricted from using the second Wi-Fi network according to the location information including the GPS coordinate.

Next, in step 505, the firewall determines if the firewall application is to determine the firewall rules. If, in step 505, it is determined that the firewall application is to determine the firewall rules, the method of FIG. 5 returns to step 503. Alternatively, if, in step 505, the firewall application determines that it is not to determine the firewall rules, the firewall application determines whether to be terminated in step 506 so that the firewall application is terminated in step 507 or the firewall application returns to step 504 in order to continue operating.

Furthermore, although the exemplary embodiments are described so as to have the user of the mobile terminal 100 configure the firewall using the firewall configuration screen, the present invention is not limited thereto. For example, the firewall included in the mobile terminal 100 may be configured remotely and/or locally, using any adequate computing device for executing a firewall configuration. Furthermore, the firewall configuration may be predetermined may be loaded onto the mobile terminal 100 by a manufacturer, network provider, or any other entity other than the user of the mobile terminal 100. Accordingly, the exemplary embodiments discussed above provide a method and apparatus to enable and disable network access for a respective application included on a mobile terminal according to at least one of a network type and/or characteristics and a location.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for configuring a firewall application executed on a mobile terminal, the method comprising:
   displaying a list of applications included on the mobile terminal after selecting the firewall application on the mobile terminal;
   receiving an input comprising a selection of at least one application from among the applications of the displayed list;
   determining, in response to the selection of the at least one application, at least one parameter type corresponding to the selected at least one application, the at least one parameter type including a location parameter type;
   selecting, in response to the determining of the at least one parameter type, at least one parameter setting corresponding to each of the determined at least one parameter type;
   configuring the firewall application to control network access for the selected at least one application based on the selected at least one parameter setting; and
   executing the firewall application to control the network access of the selected at least one application based on the configuring of the firewall application, wherein a parameter setting corresponding to the location parameter type is configured to be set to a geographic location of the mobile terminal.

2. The method of claim 1, wherein the determined at least one parameter type includes a location and a network security type.

3. The method of claim 2, wherein the determined at least one parameter type comprises at least one of a network type, a time period, a network, and a network provider.

4. The method of claim 2, wherein the location comprises at least one of a network name, Global Positioning System (GPS) coordinates, a zip code, longitude coordinates, latitude coordinates, and a range of a location including a distance.

5. The method of claim 4, wherein the range of the location includes an area between a GPS coordinate and the distance of the range or the range of the location excludes the area between the GPS coordinate and the distance of the range.

6. The method of claim 1, wherein more than one of the determined at least one parameter type is selectable for each of the applications stored on the mobile terminal.

7. The method of claim 1, wherein the selected at least one parameter setting is inputted by a user of the mobile terminal.

8. The method of claim 1, wherein the selected at least one parameter setting comprises predetermined parameter settings based on the determined at least one parameter type.

9. The method of claim 1, wherein the selected at least one parameter setting is selectable from among a plurality of parameter settings.

10. The method of claim 9, wherein the selected at least one parameter setting is downloaded to the mobile terminal from an external source.

11. The method of claim 1, wherein the applications are configured to be executed by an operating system of the mobile terminal.

12. A method for controlling network access of applications included on a mobile terminal, the method comprising:
receiving an input comprising a selection of at least one application of the applications included on the mobile terminal using a firewall configuration screen that is displayed after selecting a firewall application on the mobile terminal;
determining, in response to the selection of the at least one application, at least one parameter type corresponding to the selected at least one application, the at least one parameter type including a location parameter type;
selecting, in response to the determining of the at least one parameter type, at least one parameter setting corresponding to each of the determined at least one parameter type; and
configuring the firewall application to control the network access for the selected application based on the selected at least one parameter setting,
wherein the network access of the selected application is controlled according to the configuring of the firewall application, and
wherein a parameter setting corresponding to the location parameter type is configured to be set to a geographic location of the mobile terminal.

13. The method of claim 12, wherein the determined at least one parameter type includes a location and a network security type.

14. The method of claim 13, wherein the determined at least one parameter type comprises at least one of a network type, a time period, a network, and a network provider.

15. The method of claim 13,
wherein the location comprises at least one of a network name, Global Positioning System (GPS) coordinates, a zip code, longitude coordinates, latitude coordinates, and a range of a location including a distance, and
wherein the network security type comprises at least one of a Wired Equivalent Privacy (WEP), Wi-Fi Protected Access (WPA), WPA-Pre-Shared Key (PSK), and WPA2.

16. The method of claim 15, wherein the range of the location includes an area between a GPS coordinate and the distance of the range or the range of the location excludes the area between the GPS coordinate and the distance of the range.

17. The method of claim 12, wherein the selected at least one parameter setting is selectable from among a plurality of parameter settings.

18. The method of claim 12, wherein the selected at least one parameter setting is inputted by a user of the mobile terminal.

19. The method of claim 12, wherein the selected at least one parameter setting comprises predetermined parameter settings based on the determined at least one parameter type.

20. The method of claim 19, wherein the selected at least one parameter setting is downloaded to the mobile terminal from an external source.

21. A mobile terminal including a firewall application, the mobile terminal comprising:
a display configured to display a firewall configuration screen after selecting the firewall application on the mobile terminal;
an input unit configured to receive user input to the firewall configuration screen;
a firewall unit configured to execute the firewall application; and
at least one processor configured to:
receive an input comprising a selection of at least one application from among applications included on the mobile terminal,
determine, in response to the selection of the at least one application, at least one parameter type corresponding to the selected at least one application, the at least one parameter type including a location parameter setting,
select, in response to the determining of the at least one parameter type, at least one parameter setting corresponding to each of the determined at least one parameter type, and
configure the firewall application to control network access for the selected at least one application based on the selected at least one parameter setting,
wherein the network access of the selected at least one application is controlled according to the configuring of the firewall application, and
wherein a parameter setting corresponding to the location parameter type is configured to be set to a geographic location of the mobile terminal.

22. The mobile terminal of claim 21, wherein the determined at least one parameter type includes a location and a network security type.

23. The mobile terminal of claim 22, wherein the determined at least one parameter type comprises at least one of a network type, a time period, a network, and a network provider.

24. The mobile terminal of claim 22,
wherein the location comprises at least one of a network name, Global Positioning System (GPS) coordinates, a zip code, longitude coordinates, latitude coordinates, and a range of a location including a distance, and wherein the network security type comprises at least one of a Wired Equivalent Privacy (WEP), Wi-Fi Protected Access (WPA)-Pre-Shared Key (PSK), and WPA2.

25. The mobile terminal of claim 24, wherein the range of the location includes an area between a GPS coordinate and the distance of the range or the range of the location excludes the area between the GPS coordinate and the distance of the range.

26. The mobile terminal of claim 21, wherein more than one of the determined at least one parameter type is selectable for each of the applications stored on the mobile terminal.

27. The mobile terminal of claim 21, wherein the selected at least one parameter setting is selectable from among a plurality of parameter settings.

28. The mobile terminal of claim 21, wherein the selected at least one parameter setting is inputted by a user of the mobile terminal.

29. The mobile terminal of claim 21, wherein the selected at least one parameter setting comprises predetermined parameter settings based on the determined at least one parameter type.

30. The mobile terminal of claim 29, wherein the selected at least one parameter setting is downloaded to the mobile terminal from an external source.

* * * * *